United States Patent
Lai et al.

(10) Patent No.: US 7,418,386 B2
(45) Date of Patent: Aug. 26, 2008

(54) METHOD, APPARATUS AND SYSTEM FOR BUILDING A COMPACT LANGUAGE MODEL FOR LARGE VOCABULARY CONTINUOUS SPEECH RECOGNITION (LVCSR) SYSTEM

(75) Inventors: Chunrong Lai, Beijing (CN); Qingwei Zhao, Beijing (CN); Jielin Pan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 10/297,354

(22) PCT Filed: Apr. 3, 2001
(Under 37 CFR 1.47)

(86) PCT No.: PCT/CN01/00541

§ 371 (c)(1),
(2), (4) Date: Jul. 29, 2005

(87) PCT Pub. No.: WO02/082310

PCT Pub. Date: Oct. 17, 2002

(65) Prior Publication Data

US 2006/0053015 A1    Mar. 9, 2006

(51) Int. Cl.
*G10L 15/18* (2006.01)
*G06F 17/20* (2006.01)
(52) U.S. Cl. .................................................. 704/257
(58) Field of Classification Search .................. 704/257
See application file for complete search history.

(56) References Cited

U.S. PATENT DOCUMENTS

| 5,640,487 | A | | 6/1997 | Lau et al. |
| 6,003,003 | A | * | 12/1999 | Asghar et al. ................ 704/243 |
| 6,076,053 | A | * | 6/2000 | Juang et al. .................. 704/236 |
| 6,256,607 | B1 | * | 7/2001 | Digalakis et al. ............ 704/222 |
| 6,415,248 | B1 | * | 7/2002 | Bangalore et al. .............. 704/1 |
| 7,020,338 | B1 | * | 3/2006 | Cumbee ..................... 382/230 |

FOREIGN PATENT DOCUMENTS

| CN | 1237259 A | 12/1999 |
| EP | 0869478 A2 | 10/1998 |

OTHER PUBLICATIONS

PCT International Search Report, PCT/CN/00541, Apr. 3, 2001.

* cited by examiner

*Primary Examiner*—Susan McFadden
(74) *Attorney, Agent, or Firm*—Blakely, Sokoloff, Taylor & Zafman LLP

(57) ABSTRACT

According to one aspect of the invention, a method is provided in which a set of probabilistic attributes in an N-gram language model is classified into a plurality of classes. Each resultant class is clustered into a plurality of segments to build a code-book for the respective class using a modified K-means clustering process which dynamically adjusts the size and centroid of each segment during each iteration in the modified K-means clustering process. A probabilistic attribute in each class is then represented by the centroid of the corresponding segment to which the respective probabilistic attribute belongs.

30 Claims, 9 Drawing Sheets

METHOD, APPARATUS AND SYSTEM FOR BUILDING A COMPACT LANGUAGE MODEL FOR LARGE VOCABULARY CONTINUOUS SPEECH RECOGNITION (LVCSR) SYSTEM

FIELD OF THE INVENTION

The present invention relates to the field of speech recognition. More specifically, the present invention relates to a method, apparatus, and system for building a compact language model for a large vocabulary continuous speech recognition (LVCSR) system.

BACKGROUND OF THE INVENTION

Modern speech recognition systems are based on principles of statistical pattern recognition and typically employ an acoustic model and a language model to decode an input sequence of observations (also referred to as acoustic events or acoustic signals) representing an input speech (e.g., a sentence or string of words) to determine the most probable sentence or word sequence given the input sequence of observations. In other words, the function of a modern speech recognizer is to search through a vast space of potential or candidate sentences and to choose the sentence or word sequence that has the highest probability of generating the input sequence of observations or acoustic events. In general, most modern speech recognition systems employ acoustic models that are based on continuous density hidden Markov models (CDHMMs). In particular, CDHMMs have been widely used in speaker-independent LVCSR because they outperform discrete HMMs and semi-continuous HMBs. In CDHMMs, the probability function of observations or state observation distribution is modeled by multivariate mixture Gaussians (also referred to herein as Gaussian mixtures) which can approximate the speech feature distribution more accurately. The purpose of a language model is to provide a mechanism for estimating the probability of a word in an utterance given the preceding words. Most modern LVCSR systems typically employ some forms of N-gram language model which assumes that the probability of a word depends only on the preceding (N-1) words. N is usually limited to 2 (for a bi-gram model) or 3 for a tri-gram model). In a typical LVCSR system, the size of the language model is usually very large. For example, for a Chinese dictation system having a vocabulary size of about 50,000 words, the size of a typical tri-gram language model file is about 130 Mbytes and the size of a typical bi-gram look-ahead language model file is about 109 Mbytes. Since the language models files are usually very large, it is difficult to load such files directly into memory because of insufficient physical memory in most of the desktop machines. One solution is to use a memory-map file format to access language model files in LVCSR system. Accessing the language model files using memory-map file format is slower than loading the language model files directly into memory. In addition, because a LVCSR system accesses language model files randomly, searching such a big space randomly also costs much time. In short, the large size of language model files in a LVCSR system can negatively impact the system performance in terms of memory requirement and run-time speed.

BRIEF DESCRIPTION OF THE DRAWINGS

The present invention will be more fully understood by reference to the accompanying drawings, in which.

DETAILED DESCRIPTION

Figure 1:
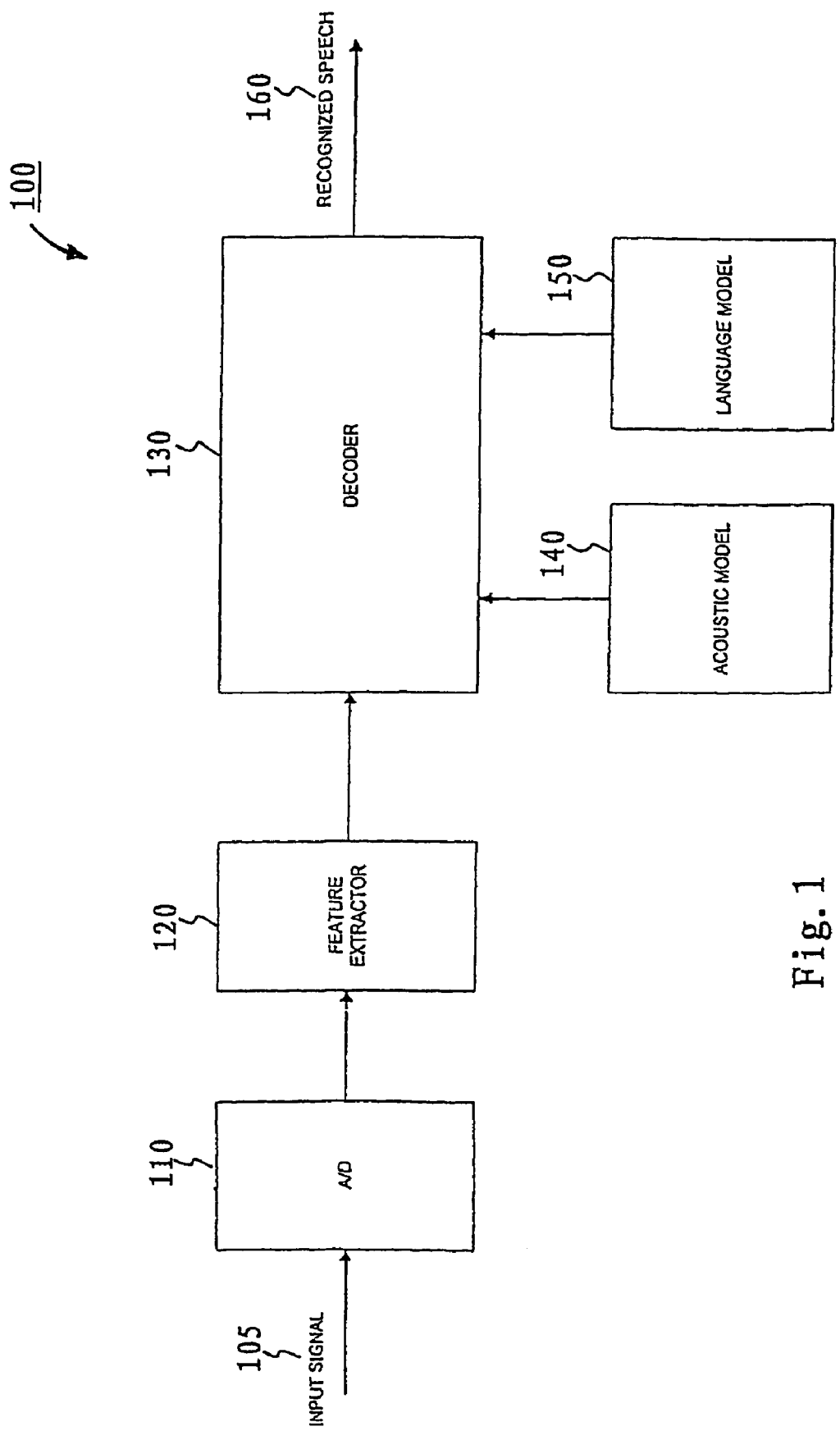
FIG. 1 is a block diagram of one embodiment of a speech recognition system according to the teachings of the present invention.

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for building a compact language model for a speech recognition system. In one embodiment, a set of N-gram probabilistic attributes that represent conditional probabilities of a set of words in an N-gram language model is classified into a plurality of classes based upon a relative order of the respective N-gram probabilistic attributes. Each resultant class is then clustered into a plurality of segments or clusters to build a corresponding codebook for the respective class using a modified K-means clustering process which dynamically adjusts the size and the centroid of each segment during each iteration in the modified K-means clustering process. In one embodiment, the modified K-means clustering process is performed until one or more optimization criteria are met. In one embodiment, after the codebook for the respective class has been built, each N-gram probabilistic attribute in the respective class can be represented by the centroid of the corresponding segment to which the respective N-gram probabilistic attribute belongs. For example, after a corresponding codebook has been built for a class of uni-gram probability values, a probability value associated with a given uni-gram node can be represented by a corresponding codeword in the respective codebook which can be referenced by a corresponding index value. In one embodiment, an N-gram probabilistic attribute is represented by a first number of data bits prior to the construction of the corresponding codebook. After the construction of the corresponding codebook, the respective N-gram probabilistic attribute can be represented by a corresponding index value having a second number of data bits which is smaller than the first number of data bits. In one embodiment, an N-gram probabilistic attribute corresponds to an N-gram probability value or an N-gram back-off weight. In one embodiment, the N-gram language model can be a tri-gram language model and the plurality of class can include a first class corresponding to a set of uni-gram probability values, a second class corresponding to a set of uni-gram back-off weights, a third class corresponding to a set of bi-gram probability values, a fourth class corresponding to a set of bi-gram back-off weights, and a fifth class corresponding to a set of tri-gram probability values.

In one embodiment, the clustering of each class of probabilistic attributes is performed as follows. First, the plurality of segments are initialized such that all segments have equivalent areas. The centroid for each segment is set such that the area of the respective segment is approximately equally split based on the corresponding centroid. A set of clustering operations is then performed iteratively until one or more optimization criteria are met to create a corresponding codebook for the respective class of probabilistic attributes. During each iteration, a total deviation of the plurality of segments is computed. The edge of each segment is then replaced by the arithmetic average of the nearest two centroids. A new centroid is then set for each resultant segment such that each resultant segment is approximately equally split by the corresponding centroid. A new total deviation of the resultant segments is then computed. In one embodiment, the one or more optimization criteria are met (e.g., the total deviation becomes steady) if one of the following conditions is satisfied:

a) For each segment, the new edge value equals the previous edge value. In other words, if the arithmetic average of the nearest two centroids equals the previous edge value then the total deviation is considered steady;
b) A predetermined number of iterations is reached; or
c) A change of total deviation is less than a predetermined threshold.

The teachings of the present invention are applicable to any method, apparatus, and system for speech recognition that employs N-gram language models. However, the present invention is not limited to N-gram language models in speech recognition systems and can be applied to the other types of language modeling in speech recognition. In addition, the present invention can also be applied to data modeling in other fields or disciplines including, but not limited to, image processing, signal processing, geometric modeling, computer-aided-design (CAD), computer-aided-manufacturing (CAM), etc.

FIG. 1 illustrates a block diagram of one embodiment of a speech recognition system 100 according to the teachings of the present invention. The system 100, as shown in FIG. 1, includes an analog to digital converter (A/D) 110, a feature extractor or spectral analysis unit 120, a decoder 130, an acoustic model 140, and a language model 150. An input signal 105 representing the input speech is first digitized using the A/D 110. In one embodiment, the digital signal is then sliced up into frames typically of 10, 15, or 20 ms. Each frame of the signal is then converted into a corresponding feature vector which is used to characterize the spectral properties of the input signal. In one embodiment, the feature vector is multi-dimensional and has a plurality of feature components. The feature vectors generated by the feature extractor unit 120 are then inputted into the decoder 130 which determines the sentence or sequence of words that has the highest probability given the acoustic events characterized by the feature vectors, based upon the acoustic model 140 and the language model 150. The language model 150, in one embodiment, is an N-gram language model which includes a plurality of codebooks. Each codebook corresponds to a class of probabilistic attributes (e.g., uni-gram probability values, uni-gram back-off weights, bi-gram probability values, etc.) that are used to represent various conditional probabilities of a set of words. For example, one of the codebook may correspond to the uni-gram probability class, another codebook may correspond to the uni-gram back-off weight class, and so on. The language model 150 and the construction of the corresponding codebooks are described in greater detail below.

Figure 2:
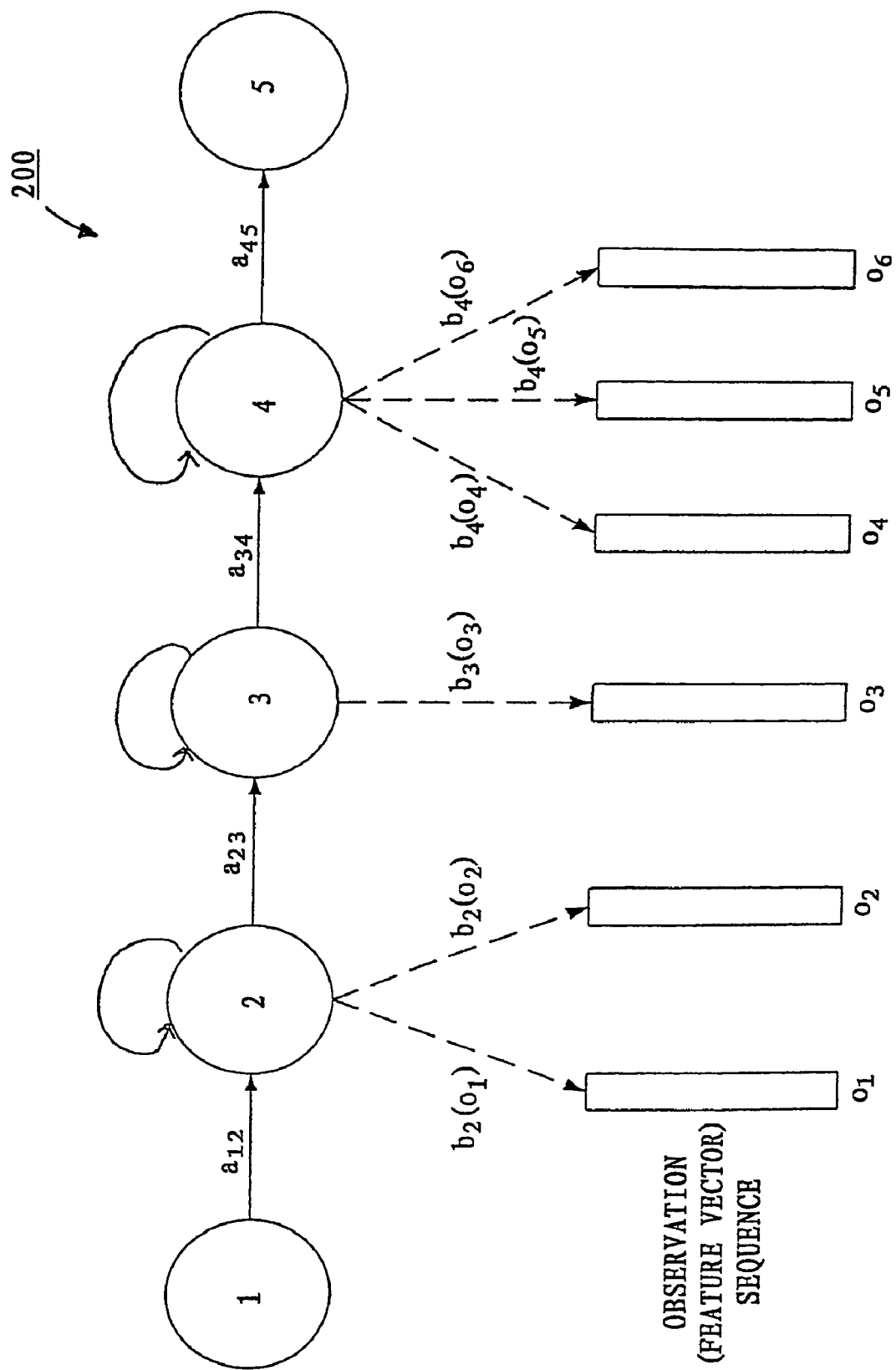
FIG. 2 is a diagram illustrating an HMM-based phone model.

FIG. 2 illustrates a diagram of one embodiment of an HMM-based phone model structure used in the acoustic model 140 to model a phonetic unit (e.g., a phoneme or a subword unit, etc.). Each individual phonetic unit is represented or modeled by a corresponding HM. As shown in FIG. 2, an HMM has a set of sequence of states (1-5) that are connected by a set of transition probabilities ($a_{12}$, $a_{23}$, $a_{34}$, $a_{45}$), and a set of observation probabilities or likelihoods ($b_2(o_1)$, $b_2(o_2)$, $b_3(o_3)$, $b_4(o_4)$, $b_4(o_5)$, $b_4(o_6)$). Each transition probability $a_{ij}$ represents the probability of transitioning from a state i to a state j. Each observation probability or distribution $b_i(o_j)$ represents the probability of an observation vector $o_j$ being generated from a state i. Thus, the transition probabilities model the durational variability in speech and the output probabilities model the spectral variability. Accordingly, the set of states, the set of transition probabilities and the set of output probabilities are the parameters that are used to define an HMM. The HMM shown in FIG. 2 has a left-right topology. In many modern speech recognition systems, each state output distribution or observation probability function is modeled by a multivariate mixture Gaussian as follows:

$$b_j(o_t) = \sum_{k=1}^{M} c_{jk} N(o_t, m_{jk}, V_{jk})$$

where $c_{jk}$ is the weight of mixture component k in state j and $N(o_t, m_{jk}, V_{jk})$ denotes a multivariate Gaussian of mean $m_{jk}$ and covariance $V_{jk}$ for the kth mixture component in state j.

Figure 3:
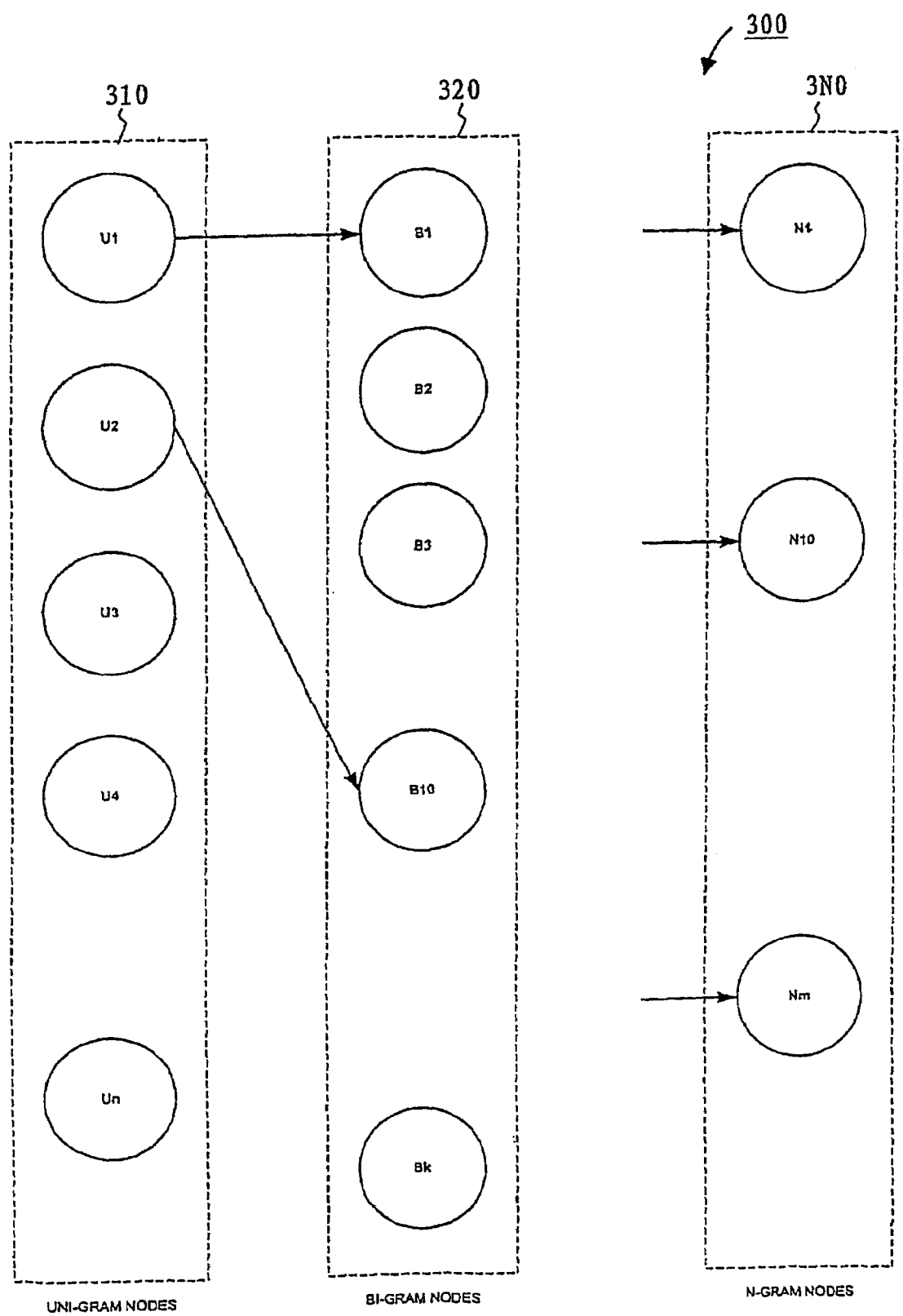
FIG. 3 is a diagram illustrating an N-gram language model.

FIG. 3 shows a structure diagram of one embodiment of an N-gram language model. As described above, the purpose of a language model is to provide a mechanism for estimating the probability of some word, $w_k$, in an utterance given the preceding words, $W_1^{k-1} = w_1 \ldots w_{k-1}$. An N-gram language model assumes that $w_k$ depends only on the preceding N-1 words, that is $$P(w_k | W_1^{k-1}) = P(w_k | W_{k-n+1}^{k-1}).$$

Because of the very large amount of models and associated data that need to be stored and processed, N is usually limited to two (for a bi-gram or 2-gram language model) or three (for a tri-gram or 3-gram language model). A back-off mechanism can be used to compute a conditional probability of a given word when some N-gram context (e.g., a tri-gram or a bi-gram) does not exist or cannot be found for the given word. For example, for given words "a" "b" "c", there may be no bi-gram probability for "b→a" or tri-gram probability for "c→b→a" in certain contexts. In this case, a back-off mechanism is used to compute the bi-gram or tri-gram probability for the given word "a". For example, for a tri-gram of words "c→b→a" (meaning word "a" preceded by word "b" preceded by word "c"), the corresponding tri-gram and bi-gram probabilities of this word sequence can be computed as follows using a back-off mechanism:

$$P(a/b, c) = \begin{cases} P(a/b, c), & \text{if } P(a/b, c) \text{ exists,} \\ P(a/b) \times w(b, c), & \text{if } w(b, c) \text{ exists,} \\ P(a/b) & \text{otherwise} \end{cases}$$

$$P(a/b) = \begin{cases} P(a/b), & \text{if } P(a/b) \text{ exists,} \\ P(a) \times w(b) & \text{otherwise} \end{cases}$$

where:

P(a/b,c) represents the tri-gram probability of the tri-gram c→b→a;
P(a/b) represents the bi-gram probability of the bi-gram b→a;
P(a) represents the uni-gram probability of word a;
w(b,c) represents the back-off weight for the bi-gram c→b; and
w(b) represents the back-off weight for the word b.

In various LVCSR systems, language model look-head techniques can be used to speed up the search in the corresponding N-gram language model. The look-head techniques are used to incorporate the language model probabilities as early as possible in the pruning process of the beam search. In general, look-head probabilities are pre-computed and stored in certain file formats or data structures.

Referring to FIG. 3, an N-gram language model in a typical LVSR system can be logically represented as a set of nodes 300 which includes a set of uni-gram nodes 310, a set of bi-gram nodes 320, and so on. The uni-gram nodes are used to represent single words and their associated probability data (e.g., probability value and back-off weight). The bi-gram nodes are used to represent word pairs and their associated probability data, etc. In one embodiment, the second words in the bi-gram nodes that follow the same first word in a uni-gram node can be grouped together and point them to the corresponding first word in the uni-gram node. Thus, only the second words and the corresponding bi-gram probability data need to be stored in the bi-gram nodes. Tri-gram nodes can be structured similarly. For example, all the third words in the tri-gram nodes that follow the same bi-gram node can be grouped together and point to the corresponding bi-gram node. Thus, only the third words and their associated probability data need to be stored in the tri-gram nodes. As shown in FIG. 3, each uni-gram node can be linked to its corresponding bi-gram nodes via a pointer. Similarly, each bi-gram node can be linked to its corresponding tri-gram nodes via a pointer, and so on. In other words, each uni-gram node points to the head of a set of bi-gram nodes whose words follow the word stored in the respective uni-gram node, each bi-gram node points to the head of a set of tri-gram nodes, and so on. Each n-gram node (e.g., uni-gram node, bi-gram node, tri-gram node, etc.) typically has the following components: the word identity of the word that the respective node represents (which can be the word itself or a word index corresponding to the word), an n-gram probability value, a back-off weight, and a pointer to the head of the corresponding (n+1)-gram nodes. For example, a uni-gram node typically contains an index value of a particular word that is represented by the respective uni-gram node, a uni-gram probability value, a uni-gram back-off weight, and a pointer to a corresponding set of bi-gram nodes that are linked with the respective uni-gram node. In one embodiment, as described above, each n-gram node only needs to store the last word of the corresponding n-gram. For example, a bi-gram node only needs to store the second word of the corresponding bi-gram that the respective bi-gram node represents, a tri-gram node only needs to store the third word of the corresponding tri-gram that the respective tri-gram node represents, and so on.

In general, for computational efficiency and to avoid numerical underflow, probability values and back-off weights associated with the n-gram nodes can be represented in logarithmic space. A n-gram node may be represented by various data structures depending upon the particular implementations and applications of the language model. For example, an n-gram node may be represented by a corresponding data structure as shown below:

```
typedef struct __asNGram{
    unsigned short   WID;
    float            P;
    int              PTR;
    float            W;
} asNGram;
``` where:
WID is an index of the word W that this node represents;
P and W are the corresponding probability value and back-off weight, respectively;
PTR is a pointer that points to the (n+1)-gram area linked by this node. If there is no (n+1)-gram linked with this node, PTR can be set to a pre-defined value.

In this example, the word index WID is an unsigned 16-bit value (e.g., unsigned short data type); the probability value P and the back-off weight are 32-bit float values (e.g., 32-bit float data type); and the PTR is a 32-bit integer value. The whole size of the data structure in this example is therefore 112 bits or 14 bytes.

An example of a data structure that can be used to represent a look-head node is shown below:

```
typedef struct __asTreeBi-gramt{
    int              NODENO;
    float            P;
} asTreeBi-gram;
```

In this example, the NODENO is a 32-bit index of the corresponding node and P is a 32-bit probability value.

It can be understood from the above description that a typical language model for a LVCSR system can contain a very large number of nodes each of which may contain corresponding probability value and/or backup weight that are represented by very large number of data bits (e.g., probability value and back-off weight are 32-bit float values in the above examples). Thus, a language model for a typical LVCSR requires a very large amount of memory space. As discussed above and described in more details below, the present invention provides a method and mechanism for reducing the size of the language model and the access time while maintaining a high level of recognition accuracy.

According to the teachings of the present invention, a method is introduced and described in detail herein to reduce the size of a language model in a LVCSR system. In one embodiment, the probability values and back-off weights (also referred to as probabilistic attributes herein) associated with the respective n-gram nodes in the respective language model are quantized or clustered by a modified K-means clustering algorithm to compress the size of the respective language model. In one embodiment, the probability values or back-off weights are divided or grouped into separate classes or groups based on the relative n-th order of the corresponding n-gram nodes and a modified K-means clustering algorithm is applied to each class to cluster the probability values or back-off weights in each class to build a corresponding codebook for the respective class. For example, uni-gram probability values associated with uni-gram nodes are grouped into one class, uni-gram back-off weights are grouped into another class, bi-gram probability values are grouped into yet another class, and so on. Thus, for a tri-gram language model (which includes uni-gram nodes, bi-gram nodes, and tri-gram nodes), there can be five separate classes (also referred to as data classes herein) that can be quantized or clustered to reduce the size of the language model. These classes include a uni-gram probability class, a uni-gram back-off weight class, a bi-gram probability class, a bi-gram back-off weight class, and a tri-gram probability class. For each class, the field of probability values (also referred to as the range of probability values) is quantized or clustered into a plurality of clusters or segments using a modified K-means clustering algorithm described in more detail below. A centroid is defined for each cluster or segment. Thus, a separate codebook can be constructed for each class of probability values or each class of back-off weights. After quantization or clustering, a given probability value or back-off weight can be represented by the centroid (also called codeword) of the corresponding segment or cluster to which the respective probability value or back-off weight belongs. By quantizing or clustering the field of probability values in each class, the probability values or back-off weights (which originally were represented by large-size data types such as 32-bit float type) can now be represented by smaller-size index values such as 8-bit char type that points to the corresponding codeword (centroid) in the corresponding codebook.

In one embodiment, the field of probability value for each class is divided into 256 segments or clusters using the modified K-means clustering process described in greater details below. As such, the corresponding codebook will have 256 codewords. Each codeword can be referenced by an 8-bit index value. Thus, assuming that the original probability values or back-off weights use 32-bit float type, these probability values or back-off weights can now be replaced by 8-bit index values which are used to reference the corresponding codewords in the codebook. It should be appreciated and understood by one skilled in the art that the teachings of the present invention are not limited to any particular number of segments or clusters. Similarly, the teachings of the present invention are not limited to any particular data types that are used to represent the probability values and back-off weights before and after the quantization. The number of segments or clusters for each class (hence the size of the corresponding codebook) and the data types that are used to represent the probability values, the back-off weights, or the indices to the codebook can vary depending upon the particular applications and implementations of the present invention.

Figure 4:
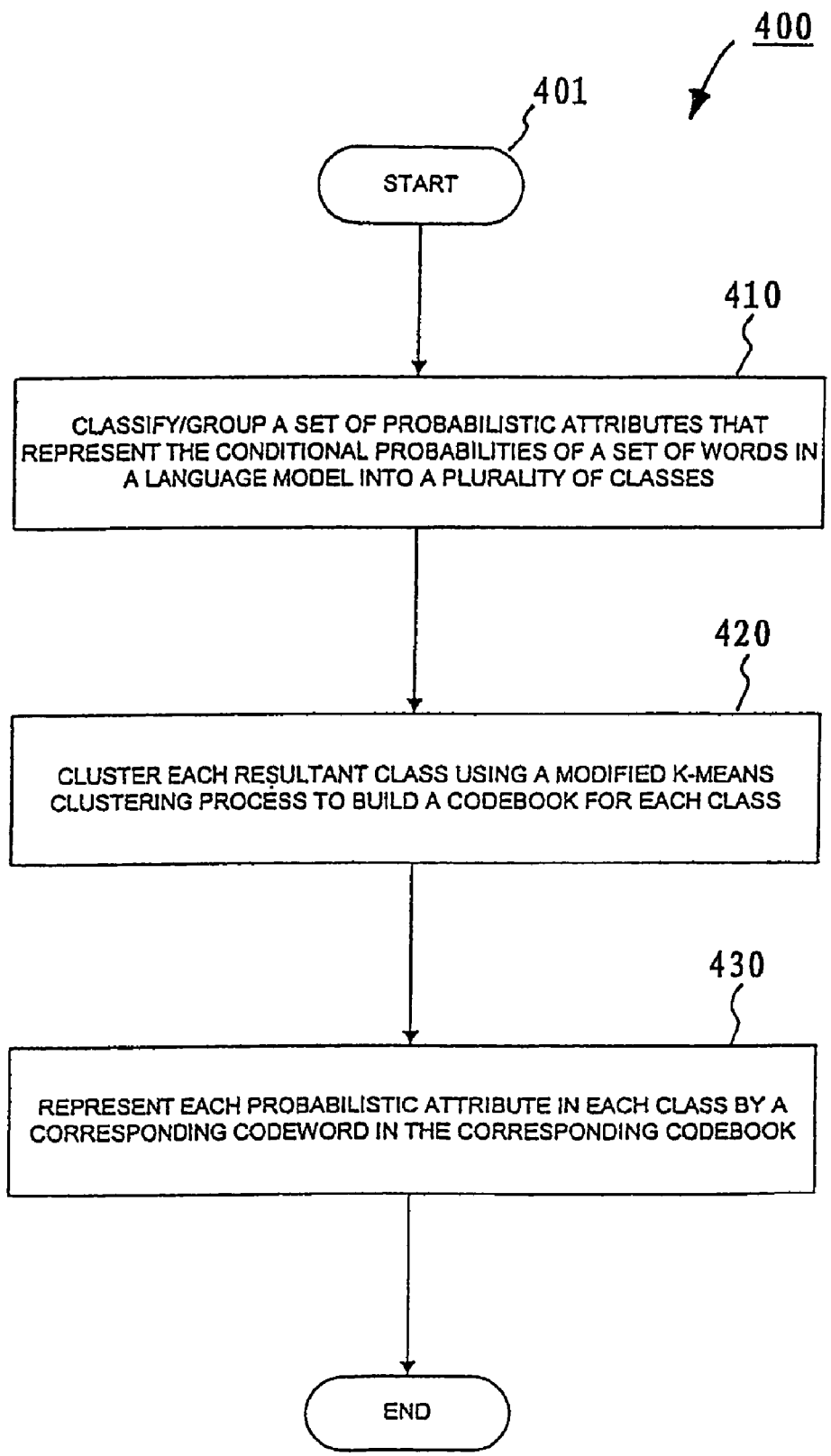
FIG. 4 shows a flow diagram of one embodiment of a method according to the teachings of the present invention.

FIG. 4 illustrates a flow diagram of one embodiment of a method 400 according to the teachings of the present invention. At block 410, the probabilistic attributes (e.g., the probability values and back-off weights) in a N-gram language model are classified or grouped into a plurality of separate classes. For example, in a tri-gram language model that includes uni-gram nodes, bi-gram nodes, and tri-gram nodes, the probabilistic attributes can be classified into five separate classes as follows: uni-gram probability, uni-gram back-off weight, bi-gram probability, bi-gram back-off weight, and tri-gram probability. At block 420, the field of value for each class is clustered or quantized using a modified K-means clustering process to build a corresponding codebook for the respective class. The modified K-means clustering process is described in more details below. At block 430, each probabilistic attribute (e.g., a probability value or a back-off weight) can be represented by the corresponding codeword in the respective codebook. In one embodiment, as described herein, after quantization or clustering, the probability value or back-off weight for any given node in the language model can then be replaced by a corresponding index value that is used to reference the corresponding codeword. For example, assuming that the original probability value or back-off weight for a given node was 32-bit data type (e.g., 32-bit float value) and that there are 256 codewords in the corresponding codebook, then after quantization or clustering, the respective probability value or back-off weight for the given node can be represented by an 8-bit index value which is used to reference or point to the corresponding codeword in the codebook.

Figure 5:
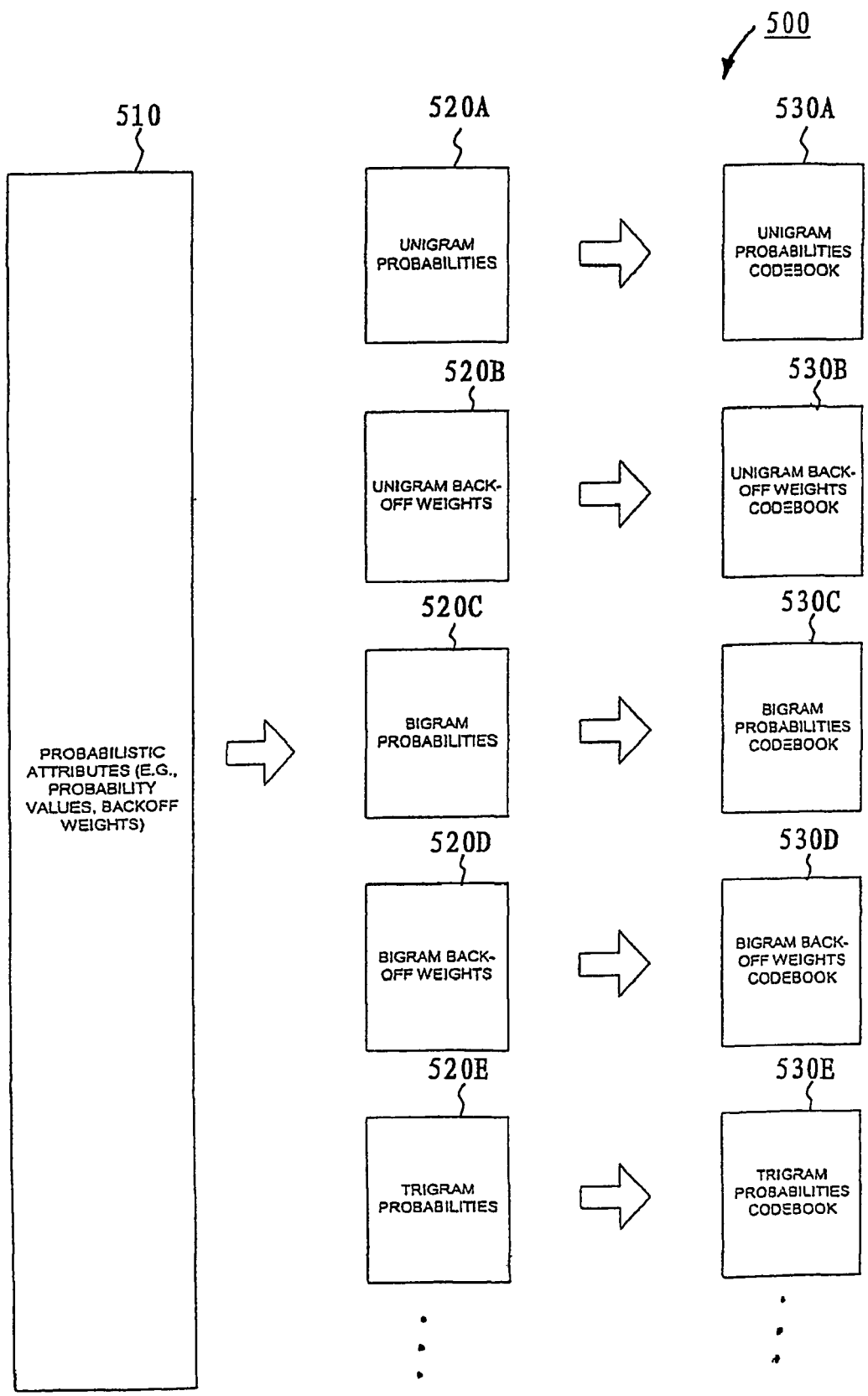
FIG. 5 shows a block diagram of one embodiment of a method according to the teachings of the present invention.

FIG. 5 shows a block diagram of one embodiment of a method according to teachings of the present invention. As shown in FIG. 5, the probabilistic attributes (e.g., probability values and back-off weights) 510 in an N-gram language model are classified or grouped into separate classes based on the n-gram order of the respective nodes. In this example, the classes include: uni-gram probability 520A, uni-gram back-off weight 520B, bi-gram probability 520C, bi-gram back-off weight 520D, tri-gram probability 520E, etc. Each class is then clustered or quantized using a modified K-means clustering process to create a corresponding codebook (e.g., 530A-E) for each respective class. As described herein, the size of the codebook for each class may or may not be the same, depending on the particular applications and implementations of the present invention. Each probabilistic attribute (e.g., a uni-gram probability value associated with a uni-gram node) can then be represented by a corresponding codeword in the respective codebook (e.g., the codebook for the uni-gram probability class).

Figure 6:
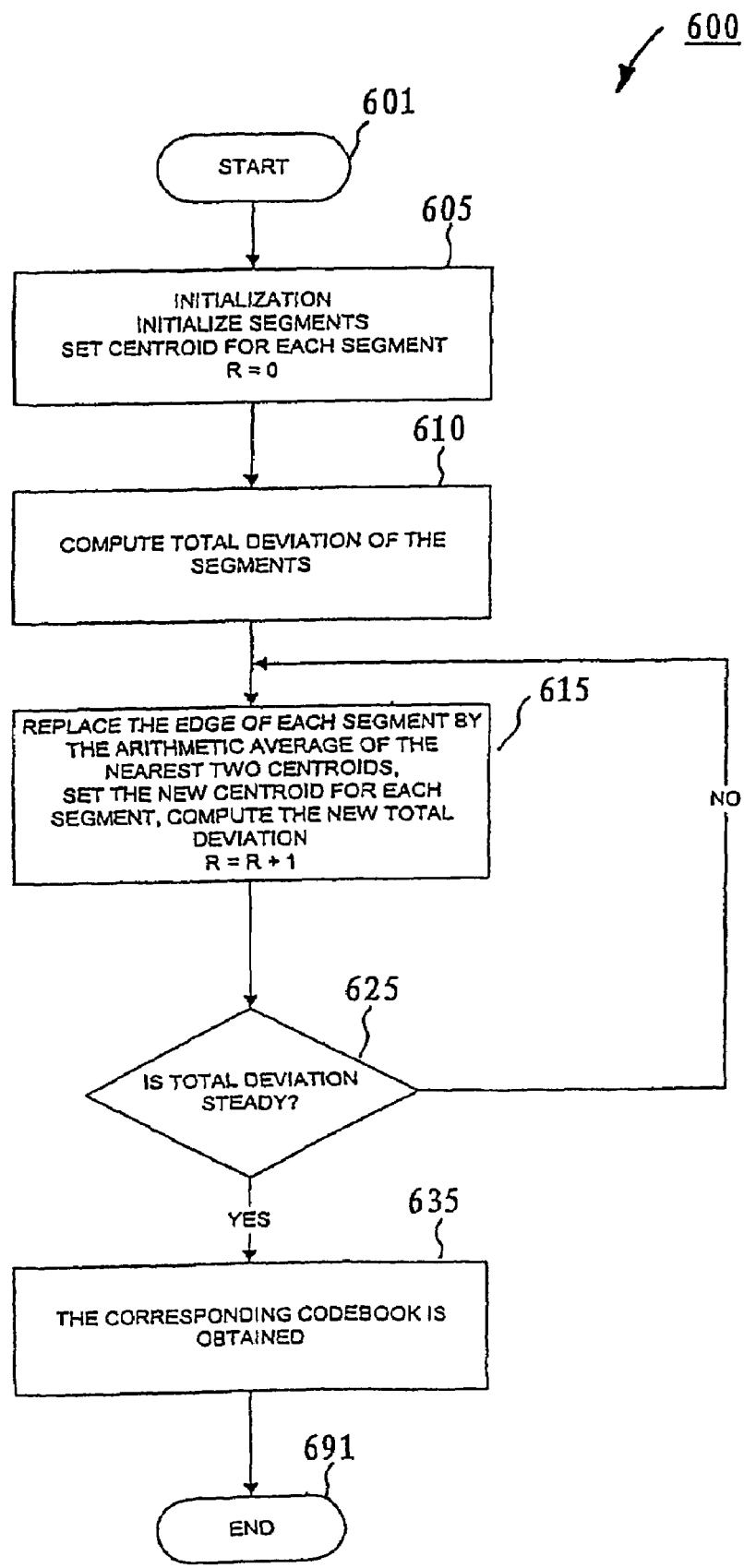
FIG. 6 illustrates a flow diagram of one embodiment of a modified K-means clustering process according to the teachings of the present invention.
Figure 7:
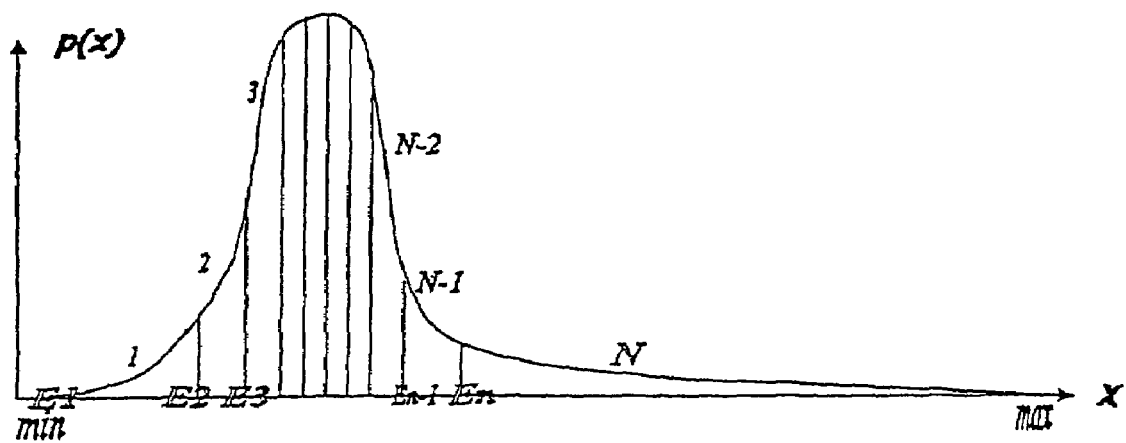
FIG. 7 provides a graphical illustration of the segment/cluster initialization according to the teachings of the present invention.
Figure 8:
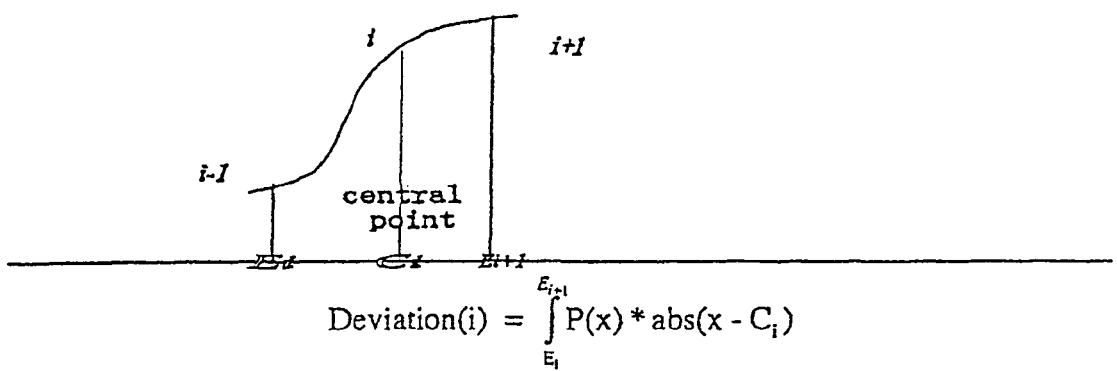
FIG. 8 provides a graphical illustration of a centroid (central point) of a segment.

FIG. 6 illustrates a flow diagram of one embodiment of a modified K-means clustering process 600 to create a corresponding codebook for a probabilistic class (e.g., uni-gram probability class or bi-gram probability class, etc.), according to the teachings of the present invention. The process starts at block 601 and proceeds to block 605 to initialize the codebook as follows:

At block 605: initialization of the process is performed by clustering the field of values for the respective class into a plurality of segments (e.g., n segments in this example) and initialize the segments such that all the segments have equivalent areas. The segments are also called clusters herein. The centroid of each segment is then set such that the respective segment is about equally split (i.e., the segment can be split into two equivalent sub-areas by the corresponding centroid). As shown in FIGS. 7 and 8, the segment initialization is performed according to the following conditions:

$$E_1 = \min(x), E_2 \ldots E_n, E_{n+1} = \max(x), C_1, C_2 \ldots C_{n-1}, C_n$$

$$\int_{E_1}^{E_2} P(x)\,dx = \int_{E_2}^{E_3} P(x)\,dx = \ldots = \int_{E_{n-1}}^{E_n} P(x)\,dx =$$

$$\int_{E_n}^{E_{n+1}} P(x)\,dx \int_{E_i}^{C_i} P(x)\,dx = \int_{C_i}^{E_{i+1}} P(x)\,dx$$

$$i = 1, 2 \ldots n$$

Where:
x is a possible probability value in the respective class;
P(x) is the probability that x occurs;
the i segment is defined as [$E_i$, $E_{i+1}$]; and
$C_i$ is defined as the centroid of the i segment.

At this point, there are n segments or clusters which have equivalent areas and each i segment has a corresponding centroid $C_i$ which can split the respective segment into two equivalent sub-areas. Set the number of iterations R=0

At block 610: compute the total deviation Dev as sum of the deviation of each segment $Dev_i$ as follows:

$$Dev = \Sigma Dev_i.$$

for the i segment, $Dev_i$ is defined as $$\int_{E_i}^{E_{i+1}} P(x) * abs(x - C_i) dx,$$

(illustrated in FIG. 8)

At block 615: replace the edge $E_i$ of each segment by the arithmetic average of the nearest two centroids as shown below:

$$E_i' = (C_{i-1} + C_i)/2$$

Figure 9:
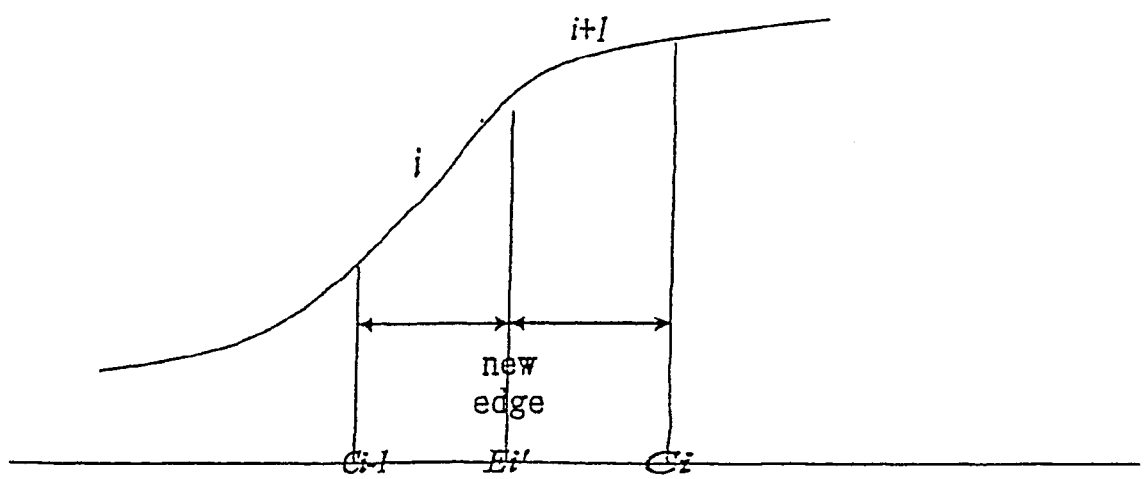
FIG. 9 provides a graphical illustration of a segment refinement according to the teachings of the present invention.

(illustrated in FIG. 9)

set the new centroid $C_i'$ for each resultant segment
compute the new total deviation Dev'
increment the number of iterations R=R+1

At block 625: if the total deviation is not steady, then the process 600 loops back to block 615. Otherwise, the corresponding codebook is obtained at block 635 and the process 600 proceeds to ends at block 691. In one embodiment, the total deviation is considered steady if one of the following conditions (also called optimization criteria) is met:

a. For each i, $E_i = E_i'$ (the new edge value is the same as the previous edge value);
b. The number of iterations performed reaches a predetermined number (R=Rmax); or
c. The change of total deviation is less than a pre-determined threshold value $\Delta_{th}$, $$|Dev' - Dev|/Dev < \Delta_{th}$$

Significant reduction in memory requirement and access time for a language model can be attained according to the teachings of the present invention. For example, assuming that before compression or quantization, the following data structures were used for n-gram nodes and look-head nodes, respectively:

n-gram node data structure (before compression):

```
typedef struct _asNGram{
    unsigned short   WID;
    float            P;
    int              PTR;
    float            W;
} asNGram;
``` where:
WID (16-bit unsigned value) is an index of the word W that this node represents;
P (32-bit float value) and W (32-bit float value) are the corresponding probability value and back-off weight, respectively;
PTR (32-bit integer value) is a pointer that points to the (n+1)-gram area linked by this node. If there is no (n+1)-gram linked with this node, PTK is a pre-defined value.

Thus the whole size of an-gram data structure in this example is 112 bits or 14 bytes.

look-head node data structure (before compression):

```
typedef struct _asTreeBi-gramt{
    int      NODENO;
    float    P;
} asTreeBi-gram;
``` where: NODENO is a 32-bit index of the corresponding node and P is a 32-bit probability value. Thus the whole size of a look-head data structure is 64 bits.

After compression, an n-gram node and a look-head node can be represented by the following data structures, respectively. It is assumed in this example that 8-bit codebooks are used (e.g., each codebook has 256 codewords):

n-gram node data structure (after compression):

```
typedef struct _asNGram{
    unsigned short   WID;
    unsigned char    P;
    int              PTR;
    unsigned char    W;
} asNGram;
``` where:
WID (16-bit unsigned value) is an index of the word W that this node represents;
P (8-bit unsigned char type) is the index value used to reference the corresponding quantized probability value (codeword) in the corresponding codebook;
W (8-bit unsigned char type) is the index value used to reference the corresponding quantized back-off weight (codeword) in the corresponding codebook;
PTR (32-bit integer value) is a pointer that points to the (n+1)-gram area linked by this node. If there is no (n+1)-gram linked with this node, PTR is a pre-defined value.

Thus the whole size of an n-gram data structure after compression in this example is 64 bits or 8 bytes.

look-head node data structure (after compression):

```
typedef struct _asTreeBi-gramt{
    int         NODENO;
    unsigned    P;
} asTreeBi-gram;
``` where: NODENO is now an 8-bit index value that is used to reference the corresponding quantized probability value in the corresponding codebook. Thus the size of the look-head data structure after compression is 40 bits.

From the above example, it can be seen that the size of the language model can be significantly reduced according to the teachings of the present invention. In this example, the size of each n-gram node is reduced from 112 bits to 64 bits and the size of each look-head node is reduced from 64 bits to 40 bits.

For a language model in a typical LVCSR system which usually has a very large number of nodes, the reduction in memory requirement can be very substantial. The additional memory requirement for the codebooks is minimal or insignificant compared to the reduction in the memory requirement for the whole language model. For example, the memory requirement for an 8-bit codebook which has 256 codewords and each codeword is a 32-bit float value is only:

256(codewords)*32(bits/codeword)=8192 bits

Tables 1 and 2 below show some experimental results based upon various experiments conducted according to the teachings of the present invention. These experiments were conducted on a 51K Mandarin LVCSR system and using a testing machine such as a double-PIII866 with 512M memory and 256K L2 Cache. Table 1 illustrates the improvements with respect to memory requirement and decoding speed using 8-bit codebooks (e.g., each codebook has 256 codewords). It can be seen from table 1 that the memory requirement and decoding speed have been reduced after compression while the increase in the word error rate (WER) of the system after compression is minimal or insignificant. The XRT notation in table 1 is used to mean times of real time.

TABLE 1

|  | BaseLine System (before compression) | System using modified K-Means clustering (after compression) |
| --- | --- | --- |
| WER | 10.0% | 10.1% |
| Tri-gram file size | 130 M | 75 M |
| Treebi-gram file size | 109 M | 68 M |
| MapMode XRT | 1.18XRT | 1.08XRT |
| Loading directly mode XRT | 1.11XRT | 1.02XRT |

As shown in table 1, the experiments and comparisons were done to show the improvements with respect to two different embodiments: one embodiment using memory-map file format for the language model files and the other embodiment loading the language model files directly into memory. After quantization the size of the language model file is reduced by 40% from 239M(130M+109M) to 143M (75M+68M). In addition, the decoding speed has been improved by 8% from 1.18×RT to 1.08×RT using memory-map file format while WER only increases from 10.0% to 10.1%. Furthermore, if language model files are loaded directly to memory, the decoding speed can be improved by another 6%.

Table 2 shows the experimental results using smaller-size codebooks. In this example, 6-bit codebooks and 4 bit codebooks were used.

TABLE 2

|  | System using modified K-means clustering (after compression) | |
| --- | --- | --- |
|  | 6-bit codebooks | 4-bit codebooks |
| WER | 10.1% | 12.8% |
| MapMode XRT | 1.07XRT | 1.03XRT |
| Loading directly mode XRT | 1.01XRT | 0.98XRT |

The invention has been described in conjunction with the preferred embodiment. It is evident that numerous alternatives, modifications, variations and uses will be apparent to those skilled in the art in light of the foregoing description.

What is claimed is:

1. A method comprising:
digitizing input speech;
converting the digitized input speech into a sequence of feature vectors;
classifying a set of probabilistic attributes in an N-gram language model into a plurality of classes, the probabilistic attributes representing various conditional probabilities of a set of words in the language of the input speech;
clustering each resultant class into a plurality of segments to build a codebook for the respective class using a modified K-means clustering process which dynamically adjusts the size and centroid of each segment during each iteration in the modified K-means clustering process;
representing a probabilistic attribute in each class by the centroid of the corresponding segment to which the respective probabilistic attribute belongs; and
applying the feature vectors to the probabilistic attributes to select a set of words corresponding to the input speech.

2. The method of claim 1 wherein a probabilistic attribute is represented by a first number of data bits before clustering.

3. The method of claim 2 wherein the respective probabilistic attribute is represented by an index value having a second number of data bits after clustering, the second number being smaller than the first number, the respective index value being used to reference a corresponding codeword in the respective codebook.

4. The method of claim 1 wherein a probabilistic attribute is a probability value associated with an n-gram node in the N-gram language model.

5. The method of claim 1 wherein a probabilistic attribute is a back-off weight associated with an n-gram node in the N-gram language model.

6. The method of claim 1 wherein the N-gram language model is a tri-gram language model and wherein the plurality of classes includes a first class corresponding to a set of uni-gram probability values, a second class corresponding to a set of uni-gram back-off weight, a third class corresponding to a set of bi-gram probability values, a fourth class corresponding to a set of bi-gram back-off weights, and a fifth class corresponding to a set of tri-gram probability values.

7. The method of claim 1 wherein clustering each resultant class includes:
initializing the plurality of segments such that all segments have equivalent areas;
setting the centroid of each segment such that the area of the respective segment is approximately equally split based on the corresponding centroid; and
performing a set of operations iteratively until one or more optimization criteria are met, including:
computing a total deviation of the plurality of segments;
replacing the edge of each segment by an arithmetic average of the nearest two centroids; and
setting a new centroid for each resultant segment.

8. The method of claim 7 wherein computing the total deviation includes:
computing a deviation of each segment based upon the corresponding centroid of the respective segment; and
summing the deviations of the segments to generate the total deviation.

9. The method of claim 7 wherein performing the set of operations includes:

determining, for each segment in the plurality of segments, whether the new edge value equals the previous edge value; and indicating that the one or more optimization criteria are met if the new edge value equals the previous edge value.

10. The method of claim 7 wherein performing the set of operations includes:

determining whether a predetermined number of iterations is reached; and indicating that the one or more optimization criteria are met if the predetermined number of iterations is reached.

11. The method of claim 7 wherein performing the set of operations includes:

determining whether a changing rate in the total deviation is less than a predetermined threshold; and indicating that the one or more optimization criteria are met if the changing rate in the total deviation is less than the predetermined threshold.

12. A method comprising:

digitizing input speech;

converting the digitized input speech into a sequence of feature vectors; and applying the feature vectors to a decoder to select a set of words corresponding to the input speech, the decoder being generated by clustering a set of probabilistic values associated with each data class of a plurality of data classes of an N-gram language model into a plurality of clusters using a modified K-means clustering process which dynamically adjusts the size and centroid of each respective cluster during each iteration in the modified K-means clustering process unit one or more predetermined conditions are satisfied, the probabilistic attributes representing various conditional probabilities of a set of words in the language of the input speech, the clustering including:

initializing the plurality of clusters such that all clusters have equivalent areas;

setting the centroid of each resultant cluster such that the area of each respective cluster is approximately equally split based on the corresponding centroid; and performing a set of operations iteratively until one or more predetermined conditions are satisfied, including:

computing a total deviation of the clusters;

replacing the edge of each cluster by an arithmetic average of the nearest two centroids; and setting a new centroid for each resultant segment.

13. The method of claim 12 wherein performing the set of operations includes:

determining, for each cluster in the plurality of clusters, whether the new edge value equals the previous edge value; and indicating that the one or more predetermined conditions are satisfied if the new edge value equals the previous edge value.

14. The method of claim 12 wherein performing the set of operations includes:

determining whether a predetermined number of iterations is reached; and indicating that the one or more predetermined conditions are satisfied if the predetermined number of iterations is reached.

15. The method of claim 12 wherein performing the set of operations includes:

determining whether a changing rate in the total deviation is less than a predetermined threshold; and indicating that the one or more predetermined conditions are satisfied if the changing rate in the total deviation is less than the predetermined threshold.

16. An apparatus comprising:

a decoder for a speech recognition system, the decoder including an input to receive a characterization of the spectral properties of a speech signal, and a language model to apply to the characterization in order to recognize the speech signal as a set of words, the language model having a plurality of codebooks each being built based upon a corresponding class of probabilistic values that represent conditional probabilities of a set of words in the in a language model, each codebook including a plurality of codewords each representing one or more corresponding probabilistic values, wherein each codebook of the plurality of codebooks is built using a modified K-means clustering process which dynamically adjusts the size and centroid of each cluster during each iteration in the modified K-means clustering process until a total deviation of the clusters is optimized based upon one or more optimization criteria.

17. The apparatus of claim 16 wherein the language model is a tri-gram language model and wherein the plurality of classes includes a first class corresponding to a set of uni-gram probability values, a second class corresponding to a set of uni-gram back-off weights, a third class corresponding to a set of bi-gram probability values, a fourth class corresponding to a set of bi-gram back-off weights, and a fifth class corresponding to a set of tri-gram probability values.

18. The apparatus of claim 16 wherein each codebook for the corresponding class of probabilistic values is built by the modified K-means clustering process which includes:

logic to initialize a plurality of clusters such that all clusters have equivalent areas;

logic to set the centroid of each cluster such that the area of the respective cluster is approximately equally split based on the corresponding centroid; and logic to perform a set of operations iteratively until one or more optimization criteria are met, including:

logic to compute a total deviation of the plurality of clusters;

logic to replace the edge of each cluster by an arithmetic average of the nearest two centroids; and logic to set a new centroid for each resultant cluster.

19. The apparatus of claim 18 wherein logic to compute the total deviation includes:

logic to compute a deviation of each cluster based upon the corresponding centroid of the respective cluster; and logic to sum the deviation of all clusters to generate the total deviation.

20. The apparatus of claim 18 wherein logic to perform the set of operations includes:

logic to determine, for each cluster, whether the new edge value equals the previous edge value.

21. The apparatus of claim 18 wherein logic to perform the set of operations includes:

logic to determine whether a predetermined number of iterations is reached.

22. The apparatus of claim 18 wherein logic to perform the set of operations includes:

logic to determine whether a changing rate in the total deviation is less than a predetermined threshold.

23. A system comprising:

a feature extraction unit to convert an input signal representing an input speech into a set of feature vectors each representing a corresponding frame of the input signal;

an acoustic model comprising a set of phonetic statistical models each representing a distinct phonetic unit;

a language model including:

a plurality of codebooks each being built based upon a corresponding class of probabilistic values that represent conditional probabilities of a set of words in the language model, each codebook including a plurality of codewords each representing one or more corresponding probabilistic values, wherein each codebook of the plurality of codebooks is built using a modified K-means clustering process which dynamically adjusts the size and the centroid of each cluster during each iteration in the modified K-means clustering process until a total deviation of the clusters is optimized based upon one or more optimization criteria; and a decoder coupled to the feature extraction unit, the acoustic model, and the language model, the decoder to recognize the input speech as a set of words based, at least in part, upon the feature vectors, the acoustic model, and the language model.

24. The system of claim 23 wherein the language model is a tri-gram language model and wherein the plurality of classes includes a first class corresponding to a set of uni-gram probability values, a second class corresponding to a set of uni-gram back-off weights, a third class corresponding to a set of bi-gram probability values, a fourth class corresponding to a set of bi-gram back-off weights, and a fifth class corresponding to a set of tri-gram probability values.

25. The system of claim 23 wherein each codebook for the corresponding class of probabilistic values is built by the modifier K-means clustering process which includes:

logic to initialize a plurality of clusters such that all clusters have equivalent areas;

logic to set the centroid to each cluster such that the area of the respective cluster is approximately equally split based on the corresponding centroid; and logic to perform a set of operations iteratively until one or more optimization criteria are met, including:

logic to compute a total deviation of the plurality of clusters;

logic to replace the edge of each cluster by an arithmetic average of the nearest two centroids; and logic to set a new centroid for each resultant cluster.

26. The system of claim 25 wherein logic to perform the set of operations includes:

logic to determine, for each cluster, whether the new edge value equals the previous edge value;

logic to determine whether a predetermined number of iterations is reached; and logic to determine whether a changing rate in the total deviation is less than a predetermined threshold.

27. A machine-readable medium comprising instructions which, when executed by a machine, cause the machine to perform operations including:

digitizing input speech;

converting the digitized input speech into a sequence of feature vectors;

classifying a set of probabilistic attributes in an N-gram language model into a plurality of classes, the probabilistic attributes representing various conditional probabilities of a set of words in the language of the input speech;

clustering each resultant class into a plurality of segments to build a codebook for the respective class using a modified K-means clustering process which dynamically adjusts the size and the centroid of each segment during each iteration in the modified K-means clustering process;

representing a probabilistic attribute in each class by the centroid of the corresponding segment to which the respective probabilistic attribute belongs; and applying the feature vectors to the probabilistic attributes to select a set of words corresponding to the input speech.

28. The machine readable medium of claim 27 wherein the N-gram language model is a tri-gram language model and wherein the plurality of classes includes a first class corresponding to a set of uni-gram probability values, a second class corresponding to a set of uni-gram back-off weights, a third class corresponding to a set of bi-gram probability values, a fourth class corresponding to a set of bi-gram back-off weights, and a fifth class corresponding to a set of tri-gram probability values.

29. The machine-readable medium of claim 27 wherein clustering each resultant class includes:

initializing the plurality of segments such that all segments have equivalent areas;

setting the centroid of each segment such that the area of the respective segment is approximately equally split based on the corresponding centroid; and performing a set of operations iteratively until one or more optimization criteria are met, including:

computing a total deviation of the plurality of segments;

replacing the edge of each segment by an arithmetic average of the nearest two centroids; and setting a new centroid for each resultant segment.

30. The machine-readable medium of claim 29 wherein performing the set of operations includes:

determining, for each cluster, whether the new edge value equals the previous edge value;

determining whether a predetermined number of iterations is reached; and determining whether a changing rate in the total deviation is less than a predetermined threshold.

* * * * *